United States Patent
Dowd et al.

(10) Patent No.: US 9,308,929 B1
(45) Date of Patent: Apr. 12, 2016

(54) STROLLER

(71) Applicant: Dorel Juvenile Group, Inc., Foxboro, MA (US)

(72) Inventors: Paul Dowd, Scarsdale, NY (US); Christopher D Miller, Bronxville, NY (US); Joseph F Brewin, Franklin, MA (US); Brian C Sundberg, Chester, NH (US); Kurt Nygren, Harvard, MA (US); Joseph D Langley, Foxboro, MA (US); Walter S Bezaniuk, Berkley, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 14/827,792

(22) Filed: Aug. 17, 2015

(51) Int. Cl.
  *B62B 9/00* (2006.01)
  *B62B 7/06* (2006.01)

(52) U.S. Cl.
  CPC .. *B62B 7/062* (2013.01); *B62B 9/00* (2013.01)

(58) Field of Classification Search
  CPC .................................. B62B 7/04; B62B 7/044
  See application file for complete search history.

(56) References Cited

U.S. PATENT DOCUMENTS

| | | | | |
|---|---|---|---|---|
| 4,212,974 A | * | 7/1980 | Murayama | C08K 5/3435 523/456 |
| 4,216,974 A | | 8/1980 | Kassai | |
| 4,765,645 A | * | 8/1988 | Shamie | B62B 7/08 280/42 |
| 5,460,399 A | | 10/1995 | Baechler et al. | |
| 5,599,033 A | | 2/1997 | Kolbus et al. | |
| 6,428,034 B1 | | 8/2002 | Bost | |
| 6,682,090 B2 | | 1/2004 | Chen | |
| 6,976,697 B2 | | 12/2005 | Britton et al. | |
| 7,168,728 B2 | | 1/2007 | Suga et al. | |
| 7,229,091 B2 | | 6/2007 | Lan | |
| 7,341,265 B1 | | 3/2008 | Liu | |
| 7,434,827 B2 | | 10/2008 | Yeh et al. | |
| 7,770,911 B2 | | 8/2010 | Dotsey et al. | |
| 8,205,907 B2 | * | 6/2012 | Chicca | B62B 7/062 280/642 |
| 8,894,090 B1 | | 11/2014 | Chen | |
| 2005/0127640 A1 | | 6/2005 | Worth et al. | |
| 2012/0025491 A1 | | 2/2012 | Li | |
| 2013/0113189 A1 | | 5/2013 | Doucette et al. | |
| 2013/0140797 A1 | | 6/2013 | Fritz et al. | |
| 2015/0307120 A1 | * | 10/2015 | Sundberg | B62B 9/20 280/642 |

FOREIGN PATENT DOCUMENTS

| | | |
|---|---|---|
| EP | 1323614 A1 | 7/2003 |
| KR | 20-0196566 Y1 | 9/2000 |

OTHER PUBLICATIONS

PCT International Search Report and Written Opinion mailed Sep. 1, 2015 and issued in connection with PCT/US2015/010977.
PCT International Search Report and Written Opinion mailed Sep. 1, 2015 and issued in connection with PCT/US2015/010977, 7 pages.

* cited by examiner

*Primary Examiner* — John Walters
*Assistant Examiner* — James Triggs
(74) *Attorney, Agent, or Firm* — Barnes & Thornburg LLP (57) ABSTRACT

A compact collapsible stroller in accordance with the present disclosure includes a mobile cart and a seat coupled to the mobile cart. The mobile cart includes a rolling base and a foldable frame that folds inwardly and outwardly from the rolling base.

3 Claims, 11 Drawing Sheets

STROLLER

BACKGROUND

The present disclosure relates to collapsible strollers for juveniles, and particularly to strollers including a collapsible frame assembly, a seat, and several wheels. More particularly, the present disclosure relates to collapsible frame assemblies for juvenile strollers.

Juvenile strollers are used widely to transport young children. Foldable strollers including collapsible frame assemblies that can be placed in vehicle trunks or storage areas. Caregivers appreciate compact foldable strollers that are easy to fold and that do not require a lot of storage space so that space is available onboard a vehicle or elsewhere for storage of other items.

SUMMARY

A collapsible stroller in accordance with the present disclosure includes a mobile cart and a seat coupled to the mobile cart. The mobile cart includes a foldable frame that supports the seat.

In illustrative embodiments, the mobile cart of the stroller comprises a rolling base having rear wheels, a foldable frame mounted on the rolling base, and a frame-motion controller adapted to control movement of the foldable frame relative to the rolling base. The foldable frame includes a rolling-base stabilizer having front wheels and a rolling-base pusher having a push handle. The frame-motion controller provides means for freeing the foldable frame to fold inwardly relative to the rolling base to a closed position when a user lifts upwardly on a fold handle and for pushing the foldable frame to fold outwardly to an opened position when a user steps on a foot pedal.

In illustrative embodiments, the frame-motion controller includes a lift-to-fold frame closer that frees the foldable frame to move from a folded-out opened position to a folded-in closed position when a user lifts upwardly on the fold handle. The lift-to-fold frame closer includes a stabilizer-and-pusher pivot lock and a fold handle that is coupled to the stabilizer-and-pusher pivot lock. The stabilizer-and-pusher pivot lock of the frame-motion controller operates to block or allow movement of the foldable frame from the folded-out opened position to the folded-in closed position. The stabilizer-and-pusher pivot lock includes left and right locking units that are coupled to the fold handle. The fold handle extends through a slot or channel formed in the seat of the stroller and is accessible to a caregiver when a child is not supported in the seat. When a caregiver lifts upwardly on the fold handle, the stabilizer-and-pusher pivot lock is unlocked to allow movement of the foldable frame from the folded-out opened position to the folded-in closed position that is associated with a collapsed-storage mode of the stroller.

In illustrative embodiments, the frame-motion controller also includes a foot-actuated push-to-fold frame opener. A caregiver can push downwardly on a foot pedal included in the frame opener to cause the rolling-base stabilizer to pivot forwardly about a stabilizer-pivot axis away from the rolling base and to cause the rolling-base pusher to pivot upwardly about a separate pusher-pivot axis away from the rolling base so that the foldable frame is unfolded to an opened position associated with an expanded use mode of the stroller.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a collapsible stroller in accordance with the present disclosure shown in an illustrative expanded use mode and showing that the stroller includes a seat mounted on a mobile cart comprising a rolling base having rear wheels, a foldable frame, and a frame-motion controller, and suggesting that the foldable frame is configured to include a rolling-base stabilizer that has front wheels and extends forwardly and downwardly from an upper end of the rolling base and a rolling-base pusher that has a push handle and extends rearwardly and upwardly from the upper end of the rolling base when the foldable frame is opened as shown in FIG. 1, and that the frame-motion controller includes a lift-to-fold frame closer including a liftable fold handle and a foot-actuated push-to-fold frame opener including two foot pedals;

DETAILED DESCRIPTION

Figure 1:
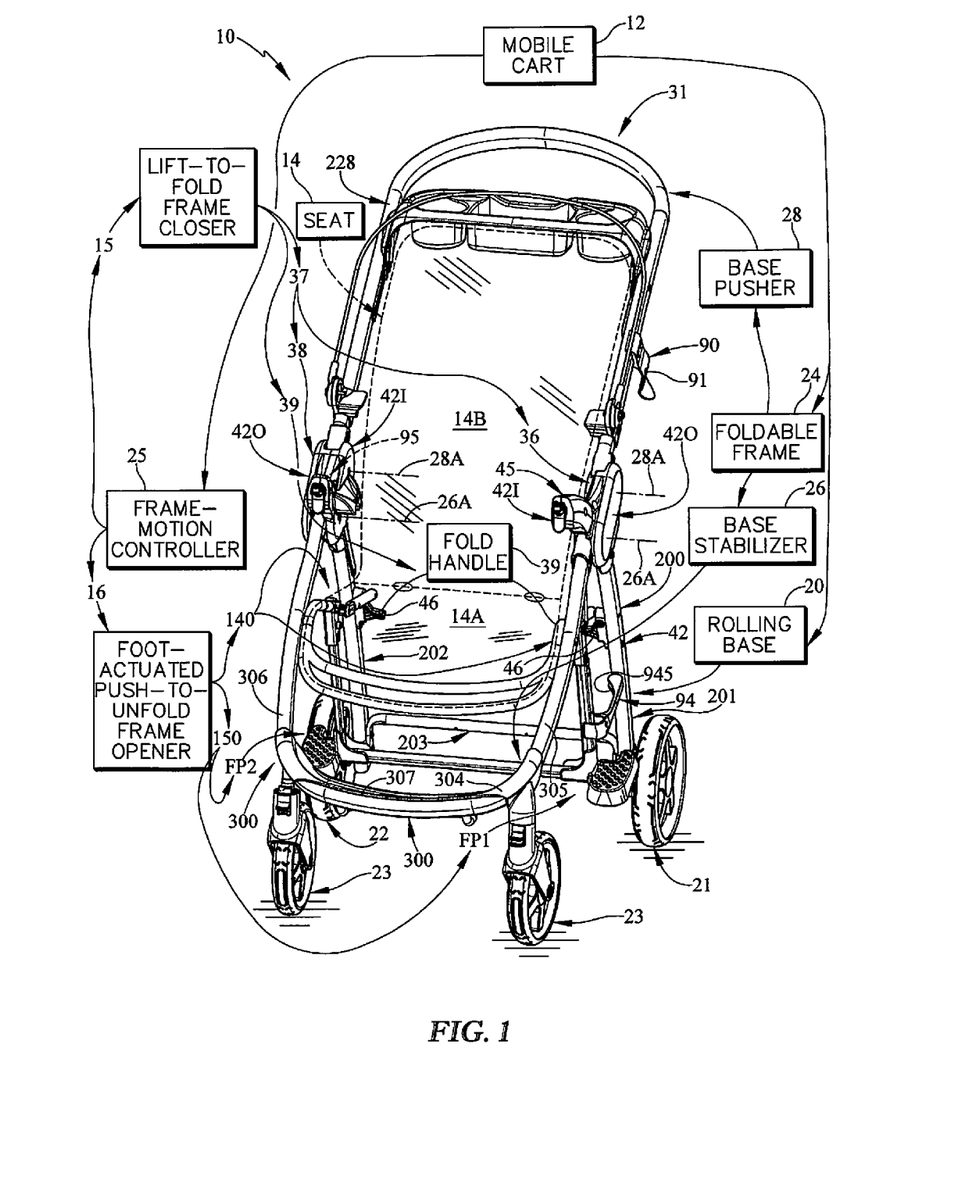
Figures 2, 3, 4:
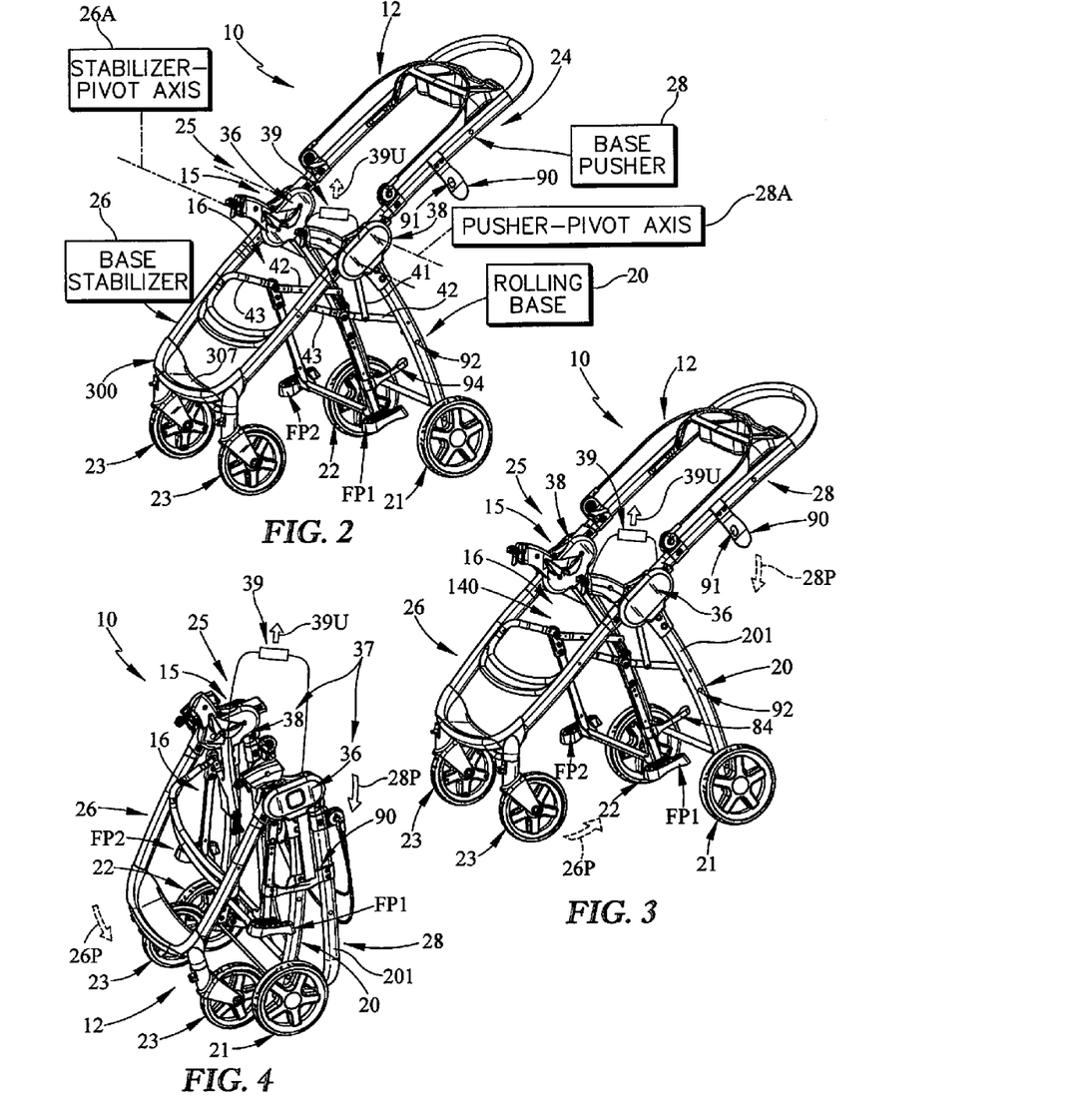
FIG. 2 is a perspective view of the mobile cart of FIG. 1 when the foldable frame is opened suggesting that the rolling-base stabilizer is mounted on the upper end of the rolling base for pivotable movement about a stabilizer-pivot axis from a folded-out position shown in FIG. 2 and associated with the expanded use mode of the stroller to a folded-in position shown in FIG. 4 and associated with a collapsed storage mode of the stroller and suggesting that the rolling-base pusher is also mounted on the upper end of the rolling base for pivotable movement about a separate pusher-pivot axis from a folded-out position shown in FIG. 2 and associated with the expanded use mode of the stroller to a folded-in position shown in FIG. 4 and associated with the collapsed storage mode of the stroller.
FIG. 3 is a view similar to FIG. 2 showing an early stage of a frame-closing sequence after a fold handle included in the lift-to-fold frame closer has been pulled upwardly by a caregiver to unlock a stabilizer-and-pusher pivot lock included in the frame-motion controller so that each of the rolling-base stabilizer and the rolling-base pusher is free to pivot relative to the upper end of the rolling base downwardly toward one another to allow a caregiver to move the foldable frame relative to the rolling base from the opened position (corresponding to the expanded use mode of the stroller) shown in FIG. 2 to the closed position (corresponding to the collapsed storage mode of the stroller) shown in FIG. 4.
FIG. 4 is a view similar to FIGS. 2 and 3 showing that the foldable frame has been moved to the closed position after a caregiver applied an upward lifting force to the fold handle included in the lift-to-fold frame closer as suggested in FIG. 3 to unlock the stabilizer-and-pusher pivot lock included in the lift-to-fold frame closer to free the rolling-base stabilizer and the rolling base pusher to pivot about separate pivot axes relative to the upper end of the rolling base toward one another.
Figure 12:
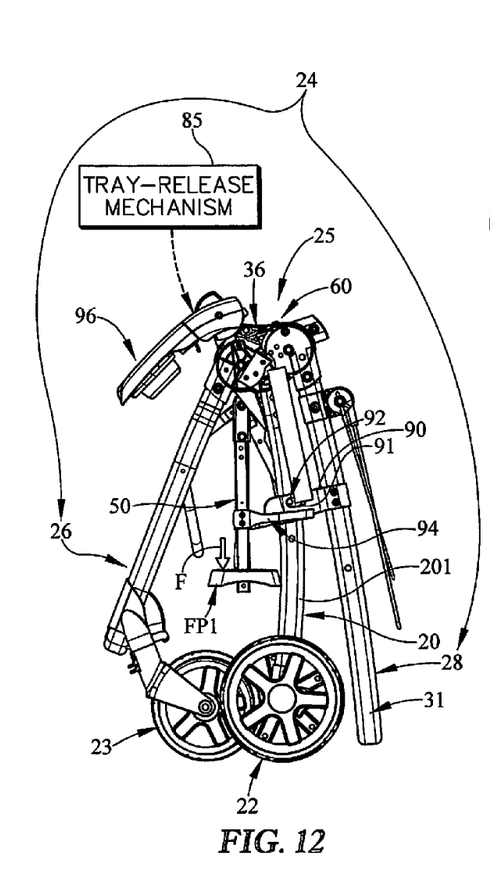
FIG. 12 is a side elevation view of the mobile cart showing the foldable frame of the mobile cart in the closed position before a user steps down on a foot pedal included in the foot-actuated push-to-unfold frame opener to pivot the rolling-base stabilizer and the rolling-base pusher of the foldable frame about their respective pivot axes to the folded-out positions and unfold the foldable frame to the opened position.
Figure 13:
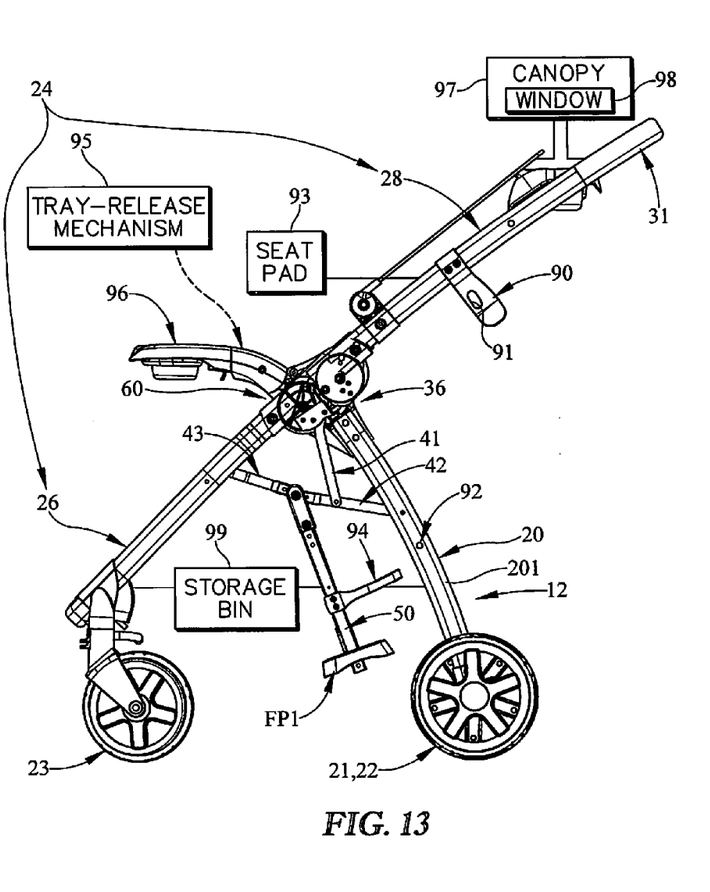
FIG. 13 is a side elevation view of the mobile cart showing the foldable frame of the mobile cart in the opened position after a user stepped down on a foot pedal included in the foot-actuated push-to-unfold frame opener causing the rolling-base stabilizer and the rolling-base pusher to move relative to the upper end of the rolling base to their folded-out positions.

A collapsible stroller 10 in accordance with the present disclosure is shown in FIG. 1 and is configured to move as suggested in FIGS. 2-4 from an expanded use mode shown in FIGS. 1, 2, and 13 to a collapsed storage mode shown in FIGS. 4 and 12. Stroller 10 includes a mobile cart 12 and a seat 14 coupled to mobile cart 12 as shown in FIG. 1. Mobile cart 12 includes a rolling base 20 including rear wheels 21, 22, a foldable frame 24 including front wheels 23, 23 and being mounted for movement on the rolling base 20 between an opened position shown in FIGS. 1 and 2 and a closed position shown in FIG. 4, and a frame-motion controller 25 as shown, for example, in FIG. 1. Frame-motion controller 25 is coupled to rolling base 20 and to foldable frame 24 and operated by a caregiver as described and illustrated herein to fold and unfold the foldable frame 24 and thereby change the mode of stroller 10 between the expanded use mode and the collapsed storage mode.

Frame-motion controller 25 includes a lift-to-fold frame closer 15 and a foot-actuated push-to-unfold frame opener 16 as suggested in FIG. 1. Lift-to-fold frame closer 15 is configured to allow a user to collapse stroller 10 for storage using only one hand. This collapse is accomplished by lifting upwardly on a fold handle 39 coupled to foldable frame 24 to cause foldable frame 24 to fold in toward rolling base 20 so as to move from an opened position shown in FIG. 2 to closed position shown in FIG. 4. The foot-actuated push-to-unfold frame opener 16 is configured to allow a user to expand stroller 10 using only one foot. This expansion is accomplished by stepping downwardly on a foot pedal FP1 to cause foldable frame 24 to unfold relative to rolling base 20 as suggested in FIGS. 12 and 13 and move from the closed position to the opened position.

Rolling base 20 of mobile cart 12 illustratively includes first leg 201, a second leg 202, and a cross bar 203 arranged to interconnect legs 201, 202 as shown in FIG. 1. A first rear wheel 21 is coupled to a lower end of first leg 201. A second rear wheel 22 is coupled to a lower end of second leg 202.

Foldable frame 24 includes a pivotable rolling-base stabilizer 26 having front wheels 23 and a pivotable rolling-base pusher 28 having a push handle 31 as shown in FIG. 1. Rolling-rolling-base stabilizer 26 is coupled to an upper end of rolling base 20 for pivotable movement about a stabilizer-pivot axis 26A. Rolling-base pusher 28 is coupled to the upper end of rolling base 20 for pivotable movement about a pusher-pivot axis 28A that is arranged, in illustrative embodiments, to lie in spaced-apart relation to stabilizer-pivot axis 26A. Each of rolling-base stabilizer 26 and rolling-base pusher 28 of the foldable frame 24 are arranged to pivot relative to rolling base 20 (as suggested by arrows 26P, 28P) from a folded-out position (corresponding to the expanded use mode of stroller 10) shown in FIGS. 1, 2, and 13 to a folded-in position (corresponding to the collapsed storage mode of stroller 10) shown in FIGS. 4 and 12.

In the opened position of foldable frame 24, rolling-base stabilizer 26 and rolling-base pusher 28 are unfolded to extend away from one another and from the upper end of the rolling base 20 to deploy a foldable seat 14 mounted to mobile cart 12 when stroller 10 is in the expanded use mode as shown, for example, in FIGS. 1-3 and 12. In the closed position of foldable frame 24, rolling-base stabilizer 26 and rolling-base pusher 28 are folded toward one another to extend along the length of rolling base 20 to stow foldable seat 14 and reduce the footprint of mobile cart 12 (i.e. make it more compact) to allow easy storage of stroller 10 when stroller 10 is in the collapsed storage mode as shown, for example, in FIGS. 4 and 13.

Frame-motion controller 25 illustratively includes a lift-to-fold frame closer 15 and a foot-actuated push-to-unfold frame opener 16 as shown in FIG. 1. Lift-to-fold frame closer 15 is configured to provide frame-closer means for selectively freeing foldable frame 24 to move to the closed position in response to a user lifting upwardly in direction 39U on fold handle 39 with one hand as suggested in FIGS. 2-4. Foot-actuated push-to-unfold frame opener 16 is configured to provide frame-opener means for pushing foldable frame 24 to the opened position in response to a user stepping down on foot pedal FP1 with one foot. Thus, using frame-motion controller 25, a caregiver can both collapse and expand stroller 10 using only one appendage (e.g. arm or leg) while allowing the other appendages of that caregiver to be free for holding a child or for some other purpose.

Lift-to-fold frame closer 15 is configured to provide fold means for releasing foldable frame 24 to move from (1) an opened position in which rolling-base stabilizer 26 and rolling-base pusher 28 are unfolded to extend away from rolling base 20 and from one another to open the foldable seat 14 that is coupled to the foldable frame 24 to support a child sitting on a seat 14 mounted to mobile cart 12 when mobile cart 12 is in use to (2) a closed position in which rolling-base stabilizer 26 and rolling-base pusher 28 are folded to move toward one another and toward rolling base 20 and extend along rolling base 20 to reduce the footprint of mobile cart 12 and to allow storage of stroller 10 in response to a user lifting upwardly with one hand on a fold handle 39 included in frame-motion controller 25. In the illustrated embodiment, lift-to-fold frame closer 15 includes a stabilizer-and-pusher pivot lock 37 and a fold handle 39 as shown in FIG. 5B. Stabilizer-and-pusher pivot lock 37 is configured to block or allow movement of foldable frame 24 from the opened position to the closed position. Fold handle 39 selectively releases stabilizer-and-pusher pivot lock 37 when a user lifts upwardly on fold handle 39 to allow movement of foldable frame 24 from the opened position to the closed position.

Stabilizer-and-pusher pivot lock 37 of the lift-to-fold frame closer 15 illustratively includes a first locking unit 36 and a second locking unit 38 as shown in FIG. 1. First locking unit 36 is coupled to first leg 201 of rolling base 20 and is arranged to lie along a first side of mobile cart 12. Second locking unit 38 is coupled second leg 202 of rolling base 20 and is arranged along and opposite second side of mobile cart 12.

Locking units 36, 38 of stabilizer-and-pusher pivot lock 37 include similar components and the first locking unit 36 shown in FIG. 5B is representative of second locking unit 38. First locking unit 36 includes a housing 42, a motion blocker 44, and a pivotable lever 46 as shown in FIG. 5B. Housing 42 includes an inner shell 421 and an outer shell 420 and is coupled to an upper end of rolling base 20. Motion blocker 44 is mounted in housing 42 to slide within housing 42 as suggested in FIG. 14. Lever 46 is coupled to fold handle 39 of stabilizer-and-pusher pivot lock 37 and is mounted on rolling base 20 to pivot about lever-pivot axis 46A when a caregiver pulls fold handle 39 upwardly.

Figure 5A:
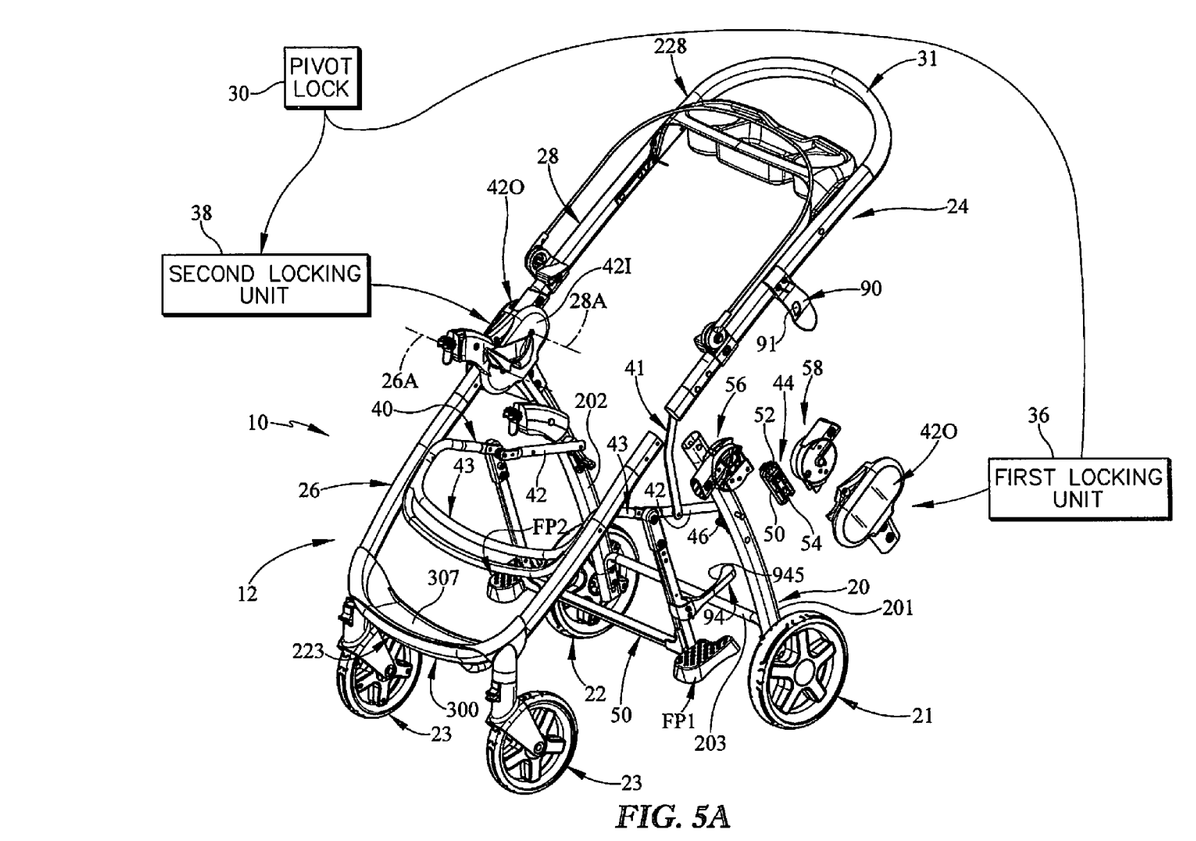
FIG. 5A is an exploded perspective assembly view of a portion of the mobile cart of FIGS. 1-4 exposing components that are included in the lift-to-fold frame closer that is included in the frame-motion controller and showing that the lift-to-fold frame closer includes a stabilizer-and-pusher pivot lock comprising first and second locking units.
Figure 5B:
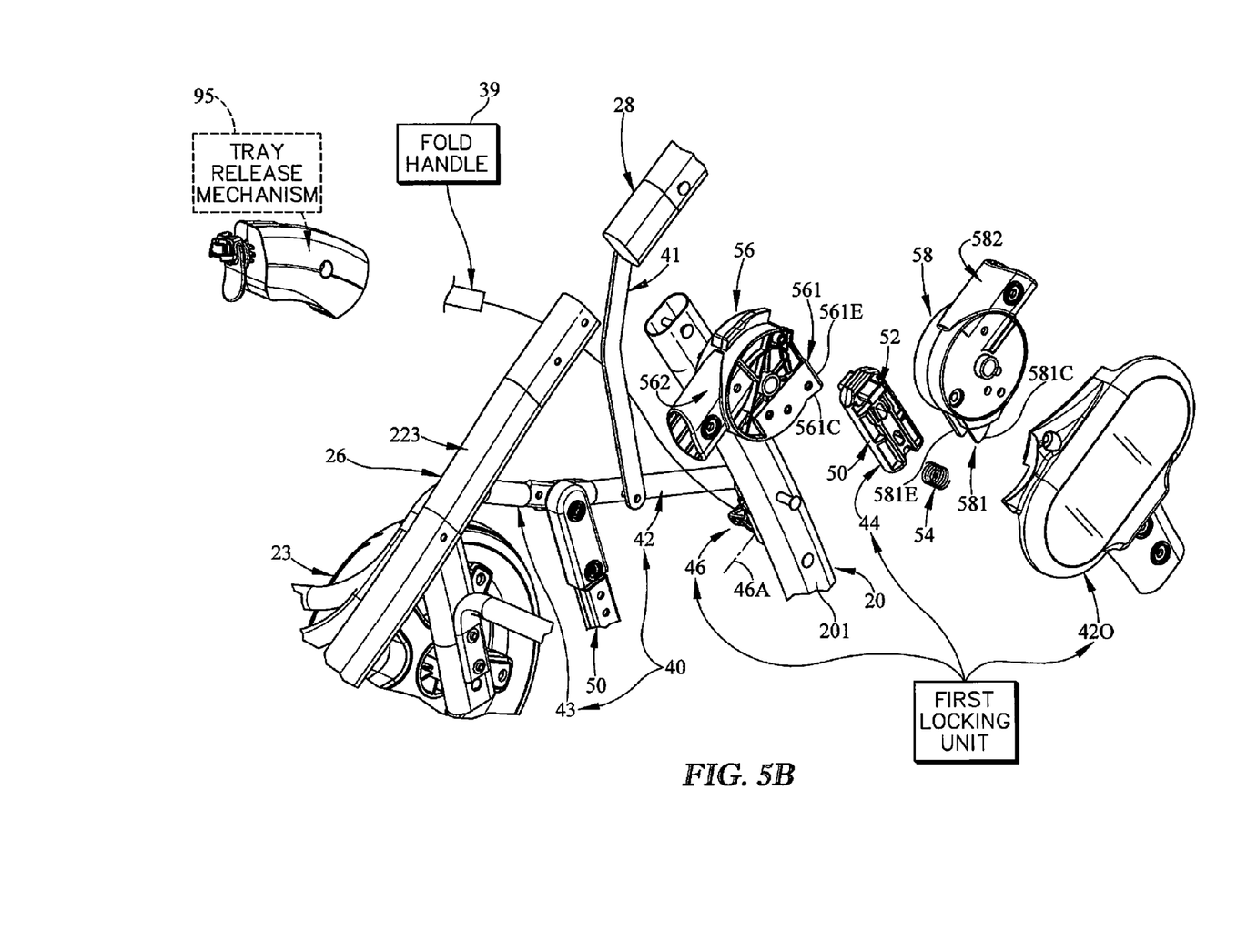
FIG. 5B is an enlarged perspective view of a portion of the mobile cart shown in FIG. 5A showing that the first locking unit of the stabilizer-and-pusher pivot lock includes a housing coupled to the rolling base, a motion blocker mounted in the housing to slide within the housing between a locked and an unlocked position, and a lever pivotably mounted to the rolling base to push the motion blocker from the locked position to the unlocked position when a caregiver lifts upwardly on the fold handle.
Figure 6:
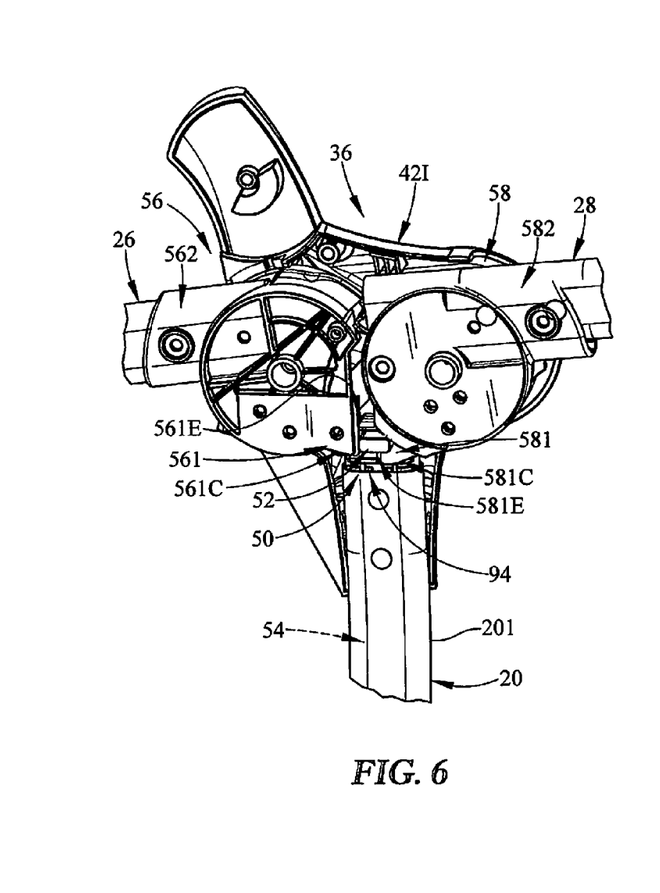
FIG. 6 is an enlarged perspective view of the first locking unit included in the stabilizer-and-pusher pivot lock of the lift-to-fold frame closer as it is illustrated in FIG. 2 showing that the motion blocker of the first locking unit is arranged to block pivoting movement of each of the rolling-base stabilizer and the rolling-base pusher relative to the rolling base.
Figure 7:
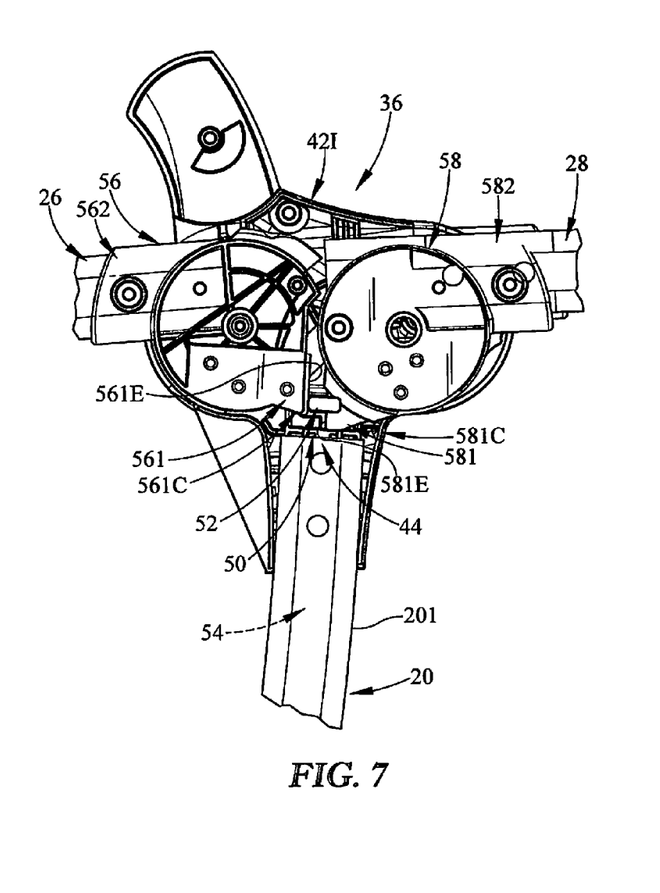
FIG. 7 is a side elevation view similar to FIG. 6 of the first locking unit included in the stabilizer-and-pusher pivot lock of the lift-to-fold frame closer as it is shown in FIG. 2.
Figure 8:
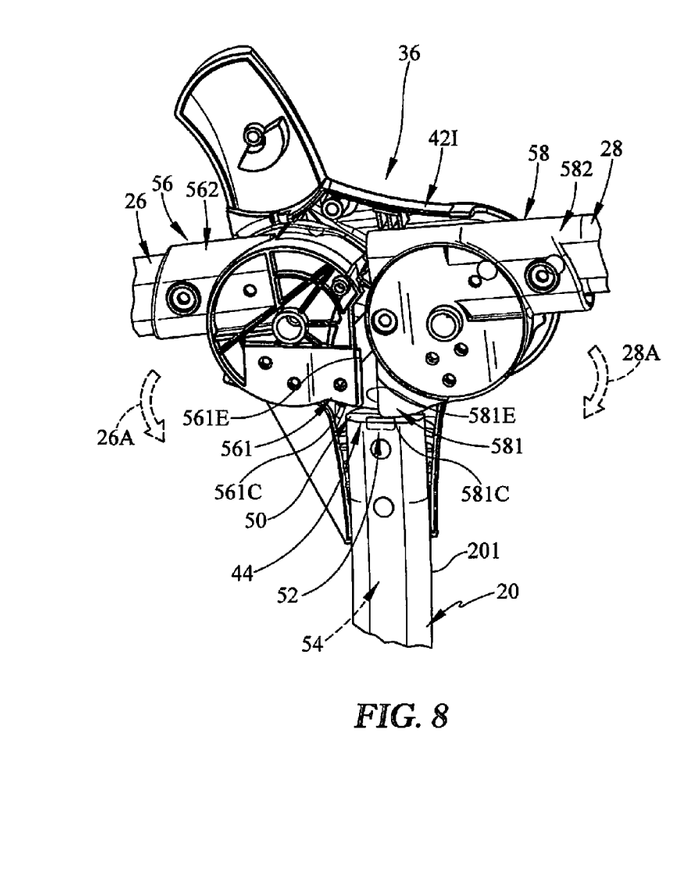
FIG. 8 is an enlarged perspective view of the first locking unit included in the stabilizer-and-pusher pivot lock of the lift-to-fold frame closer as it is illustrated in FIG. 3 showing that the motion blocker of the second locking unit has moved to allow pivoting movement of the rolling-base stabilizer and the rolling-base pusher relative to the rolling base toward one another so that the foldable frame can be moved to the closed position.
Figure 9:
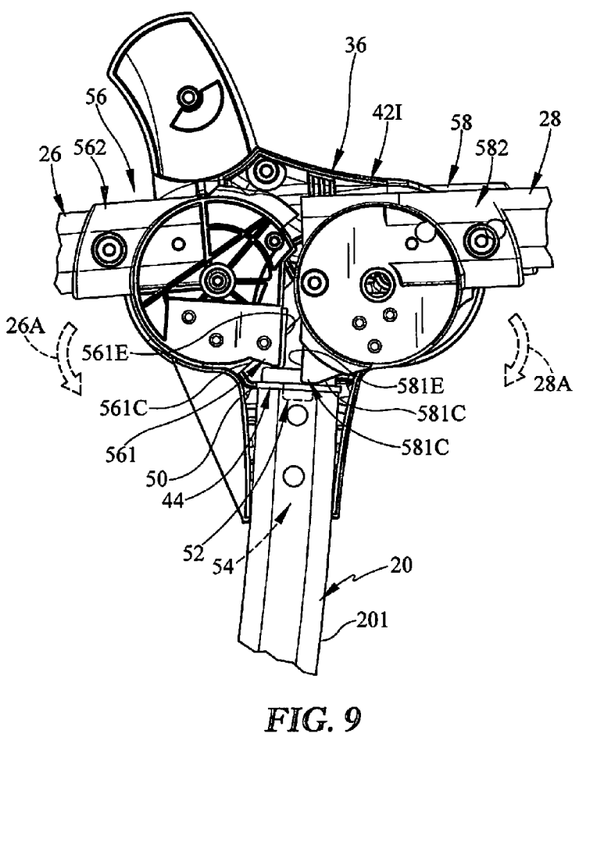
FIG. 9 is a side elevation view similar to FIG. 8 of the first locking unit included in the stabilizer-and-pusher pivot lock of the lift-to-fold frame closer as it is shown in FIG. 3.
Figures 10, 11:
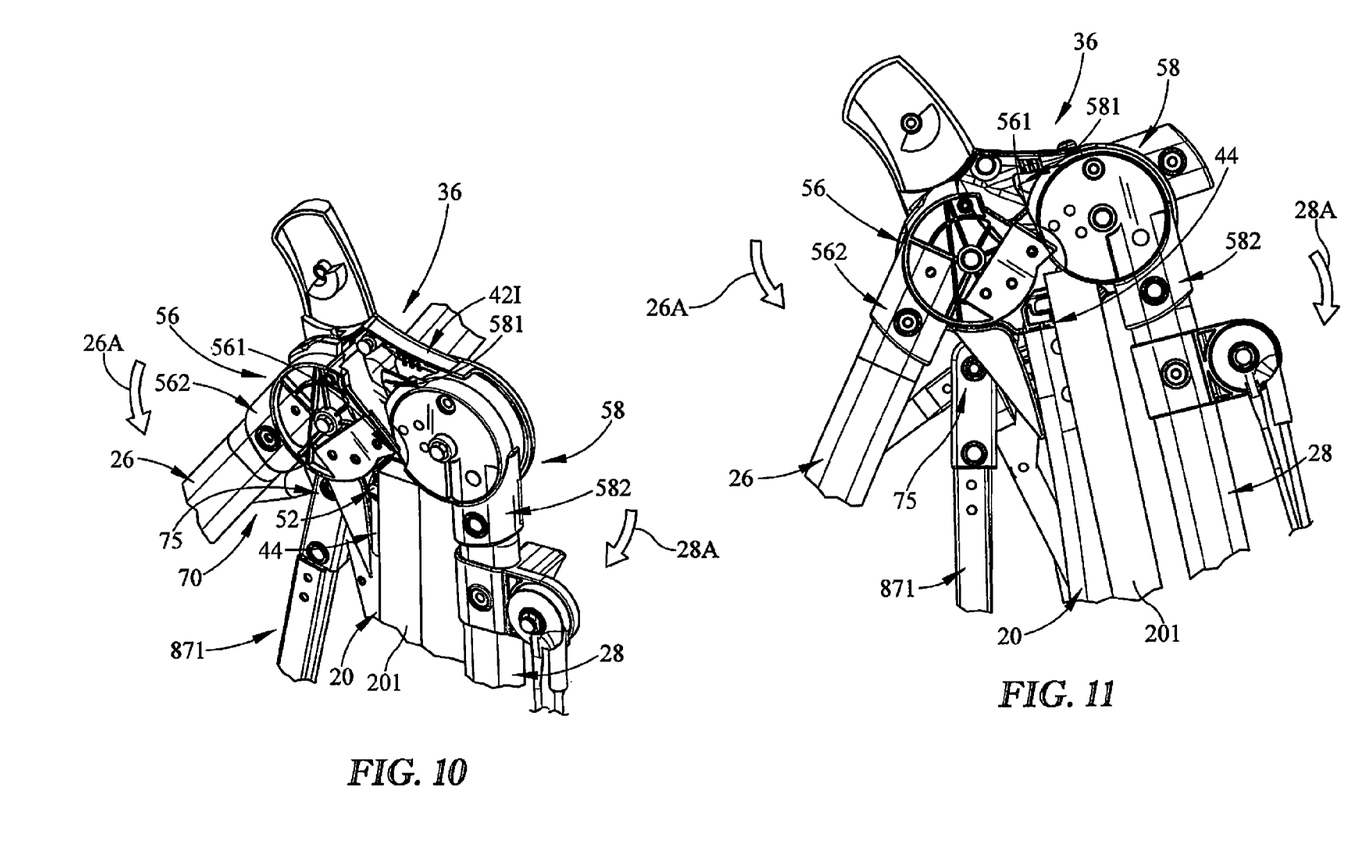
FIG. 10 is an enlarged perspective view of the first locking unit included in the stabilizer-and-pusher pivot lock of the lift-to-fold frame closer as it is illustrated in FIG. 4 showing the motion blocker of the second locking unit arranged to lie in the unlocked position to allow pivoting movement of each of the rolling-base stabilizer and the rolling-base pusher relative to the upper end of the rolling base so that the foldable frame can be moved back from the closed position to the opened position when a user steps on one of the foot pedals.
FIG. 11 is a side elevation view similar to FIG. 10 of the first locking unit included in the stabilizer-and-pusher pivot lock of the lift-to-fold frame closer as it is illustrated in FIG. 4.

Motion blocker 44 is arranged to slide between a first pivot-blocking position shown in FIG. 6 in which motion blocker 44 blocks the rolling-base stabilizer 26 and rolling-base pusher 28 of foldable frame 24 from pivoting about their respective pivot axes 26A, 28A and a second pivot-allowing position shown in FIG. 10 in which motion blocker 44 allows rolling-base stabilizer 26 and rolling-base pusher 28 of foldable frame 24 to pivot about their respective pivot axes 26A, 28A. Motion blocker 44 illustratively includes a slide 50, a blocker pin 52, and a bias spring 54 as shown in FIG. 5B. Slide 50 is mounted in housing 42 and partially in corresponding first leg 201 of rolling base 20 to slide therein. Slide 50 also supports blocker pin 52. Blocker pin 52 is arranged to block fingers (sometimes called tabs) 561, 581 of a pivot hub 56 included in rolling-base stabilizer 26 and a pivot hub 58 included in rolling-base pusher 28 when motion blocker 44 is in the first pivot-blocking position. Bias spring 54 is arranged to act between housing 42 and slide 50 to urge motion blocker 44 toward the first position blocking first and second locking units 26, 28 of foldable frame 24 from pivoting.

Lever 46 is coupled to rolling base 20 by a bracket 45 to pivot about a lever-pivot axis 46A as shown in FIG. 5B. Lever 46 engages slide 50 of motion blocker 44 to push motion blocker 44 to the second position arranged to allow rolling-base stabilizer 26 and rolling-base pusher 28 to pivot about their respective pivot axes 26A, 28A from folded-out positions to folded-in positions when a user pulls fold handle 39 upwardly as suggested in FIG. 4.

Fold handle 39 is illustratively a flexible band or strip of material that extends through a slot or channel formed in seat 14 and interconnects first and second locking units 36, 38 as shown in FIG. 1. Fold handle 39 is accessible to a caregiver when a child is not supported in seat 14. When a caregiver pulls fold handle 39 upwardly as suggested by arrow 39U, stabilizer-and-pusher pivot lock 37 changes from a locked mode to an unlocked mode to allow movement of the foldable frame 24 from the opened position to the closed position.

Seat 14 is illustratively made from fabric stretched across a frame as suggested in FIG. 1. Seat 14 includes a seat bottom 14A and a seat back 14B as suggested in FIG. 1. Fold handle 39 extends through a slot or opening formed in the seat 14 at a junction between seat bottom 14A and seat back 14B so that fold handle 39 extends upwardly above seat 14 and is available to be gripped by a caregiver when a child is not supported on seat 14 of stroller 10.

Stroller 10 also includes a foot-actuated push-to-unfold base opener 16 for use by a caregiver to unfold foldable frame 24 suggested in FIGS. 12 and 13 to change stroller 10 from a collapsed storage mode shown in FIGS. 4 and 12 to an expanded use mode shown in FIGS. 1, 2, and 13. Foot-actuated frame opener 16 includes two foot pedals FP1 and FP2 in the illustrated embodiment.

Rolling base 20 provides a rolling rear-leg unit as suggested in FIG. 1. Rolling-base stabilizer 26 provides a rolling front-leg unit that is coupled to an upper end of rolling base 20 for pivotable movement about a horizontal leg stabilizer-pivot axis 26A between a folded position associated with a collapsed storage mode of stroller 10 and shown in FIGS. 4 and 13 and an unfolded position associated with an expanded use mode of stroller 10 and shown in FIGS. 1, 2 and 12. A foot-actuated frame opener 16 is included in stroller 10 as suggested in FIG. 1 and configured to include a first foot pedal FP1 along a near side of mobile base 12 and to provide means for unfolding foldable frame 24 to change foldable frame 24 from the folded closed position shown in FIGS. 4 and 12 to the unfolded opened position shown in FIGS. 1, 2, and 13 in response to application by a caregiver of a downward force F to first foot pedal FP1. A similar second foot pedal FP2 is provided on an opposite far side of mobile base 12 as suggested in FIG. 1.

Foldable frame 24 is configured to fold when not in use to assume a folded closed position as suggested in FIGS. 4 and 12. A caregiver can fold foldable frame 24 by lifting upwardly on lift handle 39 to unlock stabilizer-and-pusher pivot lock 37 (e.g. each of first and second locking units 37, 38) to cause rolling-base stabilizer 26 to pivot about stabilizer-pivot axis 26A in a rearward (i.e. counterclockwise) direction 26P toward rolling base 20 and simultaneously to cause rolling-base pusher 28 to pivot about pusher-pivot axis 28A in a downward (i.e. clockwise) direction 28P toward rolling base 20 as suggested in FIGS. 2-4.

A caregiver can unfold foldable frame 24 by pushing downwardly on one of the footpedals FP1 or FP2 to cause rolling-base stabilizer 26 to pivot about stabilizer-pivot axis 26A in a forward (i.e. clockwise) direction way from rolling base 20 and simultaneously to cause rolling-base pusher 28 to pivot about pusher-pivot axis 28A in an upward (i.e. counterclockwise) direction away from rolling base 20 as suggested in FIGS. 11 and 13. Unfolding of foldable frame 24 of stroller 10 is accomplished easily, for example, by applying a downward pedal-actuation force F to first foot pedal FP1 of foot-actuated base opener 16 as suggested in FIG. 12 until rolling-base stabilizer 26 is pivoted about stabilizer-pivot axis 28A in a clockwise direction away from rolling base 20. In illustrative embodiments, this unfolding of foldable frame 24 also causes rolling-base pusher 28 to pivot about a pusher-pivot axis 28A in a counterclockwise direction from a stowed position shown in FIGS. 4 and 12 toward a deployed position shown in FIGS. 1, 2, and 13 owing to provision of a handle-mover linkage 41 that is coupled to push handle 15 and mobile base 12 as suggested in FIGS. 5A, 5B, 5E, and 13.

Figure 5C:
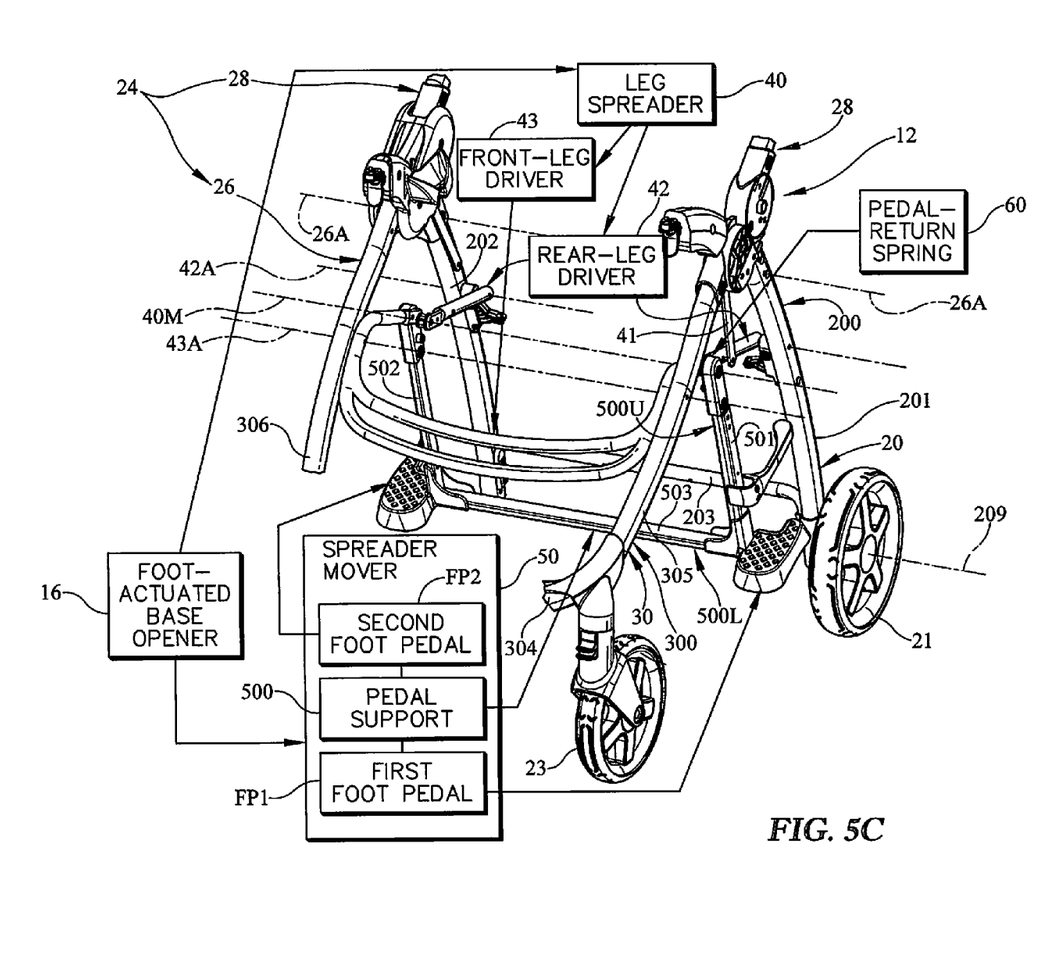
FIG. 5C is an enlarged view of a portion of the stroller of FIGS. 1-4 showing components included in the foot-actuated push-to-unfold frame opener in more detail.

Rolling base 20 includes a rear frame 200 arranged to intersect stabilizer-pivot axis 26A and rear wheels 21, 22 mounted on rear frame 200 for rotation about an axis of rotation 209 as suggested in FIG. 5C. Rear frame 200 includes a horizontally extending rear strut 203 lying between rear wheels 21, 22 and extending is spaced-apart parallel relation to axis of rotation 209. Rear frame 200 also includes first and second rear legs 201, 202. First rear leg 201 is coupled to rear strut 203 to lie near first rear wheel 21 and second rear leg 202 is coupled to rear strut 203 to lie near second rear wheel 22. A brake system may be integrated into each rear wheel 21, 22 or more generally into rolling base 20.

Rolling-base stabilizer 26 of mobile base 12 includes a front frame 300 arranged to intersect stabilizer-pivot axis 26A and front wheels 23 mounted on front frame 300 using a swivel mount in an illustrative embodiment. Front frame 300 includes a horizontally extending front strut 304 lying between front wheels 23 and in generally parallel relation to rear strut 203. Front frame 300 also includes first and second front legs 305, 306. First front leg 305 is coupled to front strut 304 near first front wheel 23 and second front leg 306 is coupled to front strut 304 near second front wheel 301. A foot-rest panel 307 is coupled to front frame 300 in an illustrative embodiment as suggested in FIG. 1.

Rolling-base stabilizer 26 of the foldable frame 24 illustratively includes front wheels 23, a U-shaped stabilizer frame member 300, and pivot hubs 56 as suggested in FIGS. 5A and 5B. Front wheel 23 is coupled to U-shaped stabilizer frame member 300 at the apex of frame member 300 and is arranged to engage ground underlying collapsible stroller 10. U-shaped frame member 300 extends between left and right pivot hubs 56 and provides a footrest 307 for a child seated on collapsible stroller 10. In some embodiments, rolling-base stabilizer 26 may include one or more wheels.

Each of the left and the right pivot hubs 56 included in the rolling-base stabilizer 26 is coupled to a corresponding housing 42 for rotation about stabilizer-pivot axis 26A as shown in FIG. 1. Each pivot hub 56 is formed to include a finger 561 and a stabilizer frame receiver 562 as shown in FIGS. 5B and 6-11. Each finger 561 extends away from the stabilizer frame member 300 and is engaged by the motion blockers of the corresponding first and second locking units 36, 38 to block rotation of rolling-base stabilizer 26 relative to rolling base 20 about stabilizer-pivot axis 26A when foldable frame 24 is in the opened position and motion blockers 44 of first and second locking units 36, 38 are in the locked position. Each stabilizer frame receiver 562 receives a portion of the stabilizer frame member 300 to couple the left and the right pivot hubs 56 to the stabilizer frame member 300.

Foot-actuated push-to-unfold frame open 16 can be operated by a caregiver to unfold the foldable frame 24 to its opened position and change stroller 10 to the expanded use mode without lifting upwardly on lift handle 39 included in the lift-to-fold frame closer 15. In the illustrative embodiment, fingers 561 of pivot hubs 56 included in rolling-base stabilizer 26 are shaped to move first and second locking units 36, 38 to the unlocked position during expansion of collapsible stroller 10 so that a user need not lift fold handle 39 when unfolding foldable frame 24. In the exemplary embodiment, fingers 561 of pivot hubs 56 are formed to include an engagement surface 561E and a cam surface 561C as shown in FIG. 5B.

Engagement surface 561E of each of finger 561 is arranged to extend at a right angle from stabilizer frame member 223 and to be engaged by motion blockers 44 of corresponding first and second locking units 36, 38 to block rotation of rolling-base stabilizer 26 relative to rolling base 20 about stabilizer-pivot axis 26A when foldable frame 24 is in the opened position and motion blockers 44 of first and second locking units 36, 38 are in the locked position. Cam surface 561C of each of fingers 561 included in rolling-base stabilizer 26 are arranged to extend at an obtuse cam angle from stabilizer frame member 223 and to push pins 52 of motion blockers 44 included in first and second locking units 36, 38 from the locked position to the unlocked position during movement of foldable frame 24 from the closed position to the opened position.

Rolling-base pusher 28 of foldable frame 24 illustratively includes a U-shaped pusher frame member 228 and pivot hubs 58 as suggested in FIGS. 5A and 5B. U-shaped pusher frame member 228 extends between left and right pivot hubs 58 and forms the push handle 31 of stroller 10 which is adapted to be pushed by a caregiver driving collapsible stroller 10.

Each of the left and the right pivot hubs 58 included in the rolling-base pusher 28 is coupled to a corresponding housing 42 for rotation about pusher-pivot axis 28A as shown in FIG. 1. Each pivot hub 58 is formed to include a finger 581 and a pusher frame receiver 582 as shown in FIGS. 5B and 6-11. Each finger 581 extends away from the pusher frame member 228 and is engaged by motion blockers 44 of the corresponding first and second locking units 36, 38 to block rotation of rolling-base pusher 28 relative to rolling base 20 about pusher-pivot axis 28 when foldable frame 24 is in the opened position and motion blockers 44 of first and second locking units 36, 38 are in the locked position. Each pusher frame receiver 582 receives a portion of the pusher frame member 228 to couple the left and the right pivot hubs 58 to the pusher frame member 228.

In the illustrative embodiment, fingers 581 of pivot hubs 58 included in rolling-base pusher 28 are shaped to move first and second locking units 36, 38 to the unlocked position during expansion of collapsible stroller 10 so that a user need not lift fold handle 39 when unfolding foldable frame 24. In the exemplary embodiment, fingers 581 of pivot hubs 58 are formed to include an engagement surface 581E and a cam surface 581C as shown in FIG. 5B.

Engagement surface 581E of each of finger 581 is arranged to extend at a right angle from pusher frame member 228 and to be engaged by motion blockers 44 of corresponding first and second locking units 36, 38 to block rotation of rolling-base pusher 28 about pusher-pivot axis 28A relative to rolling base 20 when foldable frame 24 is in the opened position and motion blockers 44 of first and second locking units 36, 38 are in the locked position. Cam surface 581C of each of fingers 581 of pivot hubs 58 included in rolling-base pusher 28 is arranged to extend at an obtuse cam angle from pusher frame member 228 and to push pins 52 of motion blockers 44 included in first and second locking units 36, 38 from the locked position to the unlocked position during movement of foldable frame 24 from the closed position to the opened position.

Foot-actuated frame opener 16 includes a leg spreader 40 pivotably coupled to each of rear and front legs 201, 202, 305, 306 of mobile base 12 and a spreader mover 50 pivotably coupled to leg spreader 40 and formed to include first foot pedal FP1 and a second foot pedal FP2 as suggested in FIGS. 1-4 and C. When a caregiver steps on and pushes downwardly against first foot pedal FP1 (or second foot pedal FP2) of spreader mover 50, the spreader mover 50 moves downwardly to change the shape of leg spreader 40 and thus causes front legs 305, 306 to move away and spread apart from rear legs 201, 202 to unfold foldable frame and change stroller 10 from the collapsed storage mode shown in FIGS. 4 and 12 to the expanded use mode as suggested in FIGS. 1, 2, and 13. Such leg spreading takes place when front legs 305, 306 pivot about stabilizer-pivot axis 26A and move away from rear legs 201, 202.

Leg spreader 40 of foot-actuated frame opener 16 is a mechanical linkage that is located under juvenile seat 14 and includes a front-leg driver 43 and a rear-leg driver 42. An outer portion of front-leg driver 43 is coupled to rolling front-leg unit 300 for pivotable movement about a front pivot axis 43A. An outer portion of rear-leg driver 42 is coupled to rolling rear-leg unit 200 for pivotable movement about a rear pivot axis 42A that is parallel to the front pivot axis 43A. Inner portions of front-leg and rear-leg drivers 43, 42 are coupled to one another for relative movement about a middle pivot axis 40M that lies between and is parallel to each of the front and rear pivot axes 43A, 42A.

Figure 5D:
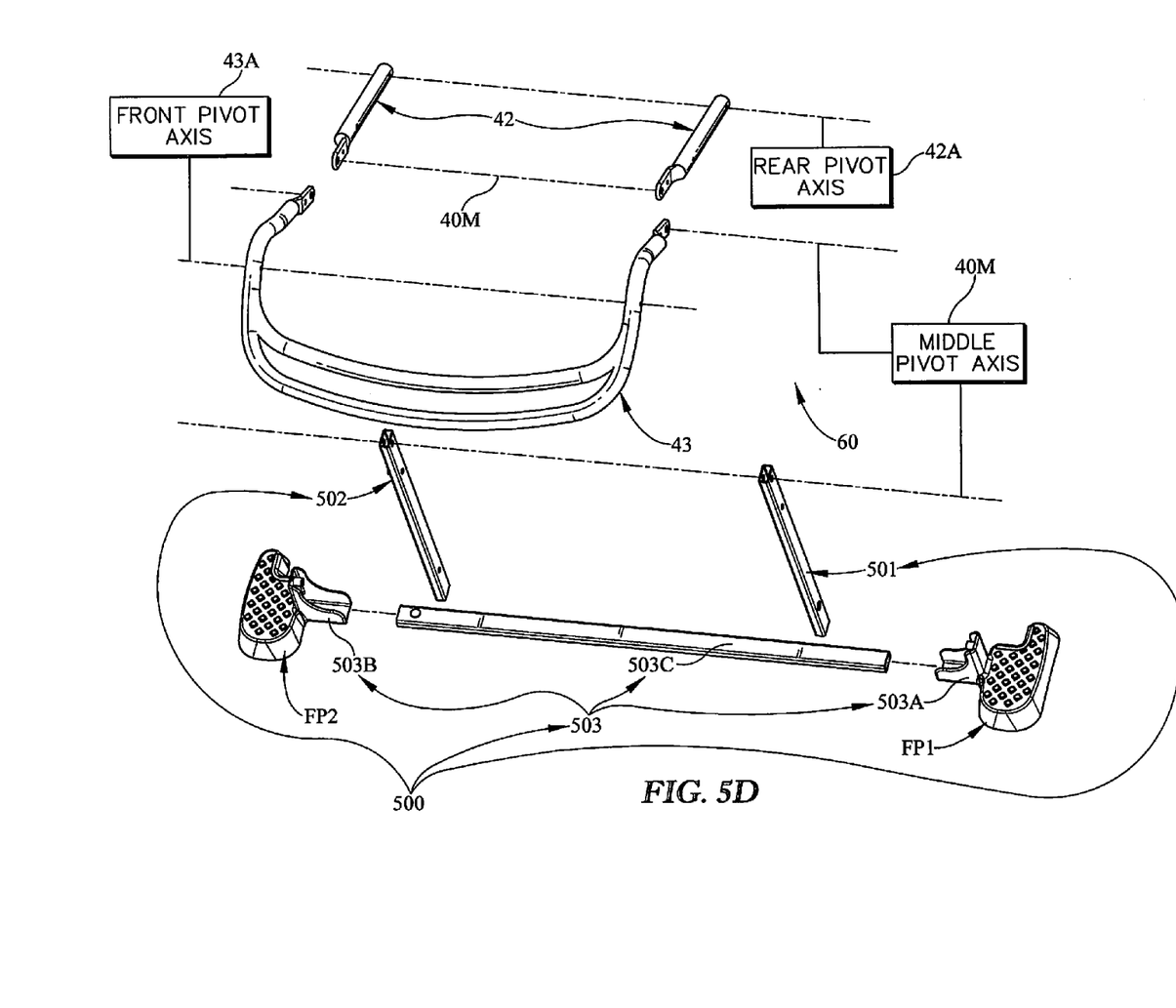
FIG. 5D is an enlarged exploded perspective assembly view of components included in the foot-actuated push-to-unfold frame opener shown in FIG. 5C.

Spreader mover 50 of foot-actuated frame opener 16 is coupled to one of the front-leg and rear-leg drivers 42, 43 to pivot about the middle pivot axis 40M. Spreader mover 50 is formed to include two foot pedals FP1, FP2 that are arranged to be accessed and used by a caregiver when foldable frame 24 is folded to the closed position and stroller 10 is in the collapsed storage mode to unfold the foldable frame 24 to the opened position and to change stroller 10 to the expanded use mode. Spreader mover 50 also includes a pedal support 500 having an upper portion 500U pivotably coupled to spreader 40 to pivot about middle pivot axis 40M and a lower portion 500L coupled to first and second foot pedals FP1, FP2 as suggested in FIG. 5C. In illustrative embodiments, pedal support 500 includes a first arm 501, a second arm 502, and a center strut 503 arranged to extend between and made with lower portions of each arm 501, 502. First foot pedal FP1 is coupled to one end of center strut 503 and second foot pedal FP2 is coupled to an opposite end of center strut 503. As suggested in FIG. 5D, center strut 503 includes a first elbow 503A coupled to first arm 501 and first foot pedal FP1, a second elbow 503B coupled to second arm 502 and second foot pedal FP2, and a rod 503C interconnection first and second elbows 503A, 503B.

In use, while the foldable frame 24 is folded and the stroller 10 is in the collapsed storage mode, a caregiver desiring to change the stroller 10 to the expanded use mode steps on one of the foot pedals FP1, FP2 included in spreader mover 50 and pushes downwardly on a foot pedal FP1 or FP2 to pull the inner portions of the front-leg and rear-leg drivers 43, 42 downwardly simultaneously to cause outer portions of the front-leg and rear-leg drivers 43, 42 to move away from one another. Such spreading apart movement of front-leg and rear-leg drivers 43, 42 of the leg spreader 40 causes the rolling-base stabilizer 26 to pivot about the horizontal stabilizer-pivot axis 26A and away from rolling base 20. Rolling-base pusher 28 is also caused to pivot about the separate horizontal pusher-pivot axis 28A in a direction away from rolling base 20 to reach a deployed position associated with the foldable frame being in the opened position as shown, for example, in FIGS. 1, 2, and 13. This foot pressure is applied by the caregiver until the rolling-base stabilizer 26 and rolling-base pusher 28 are spread apart to unfold foldable frame 24 fully relative to rolling base 20 and therefore cause the stroller 10 to be converted to expanded use mode shown in FIGS. 1, 2, and 13.

Figure 5E:
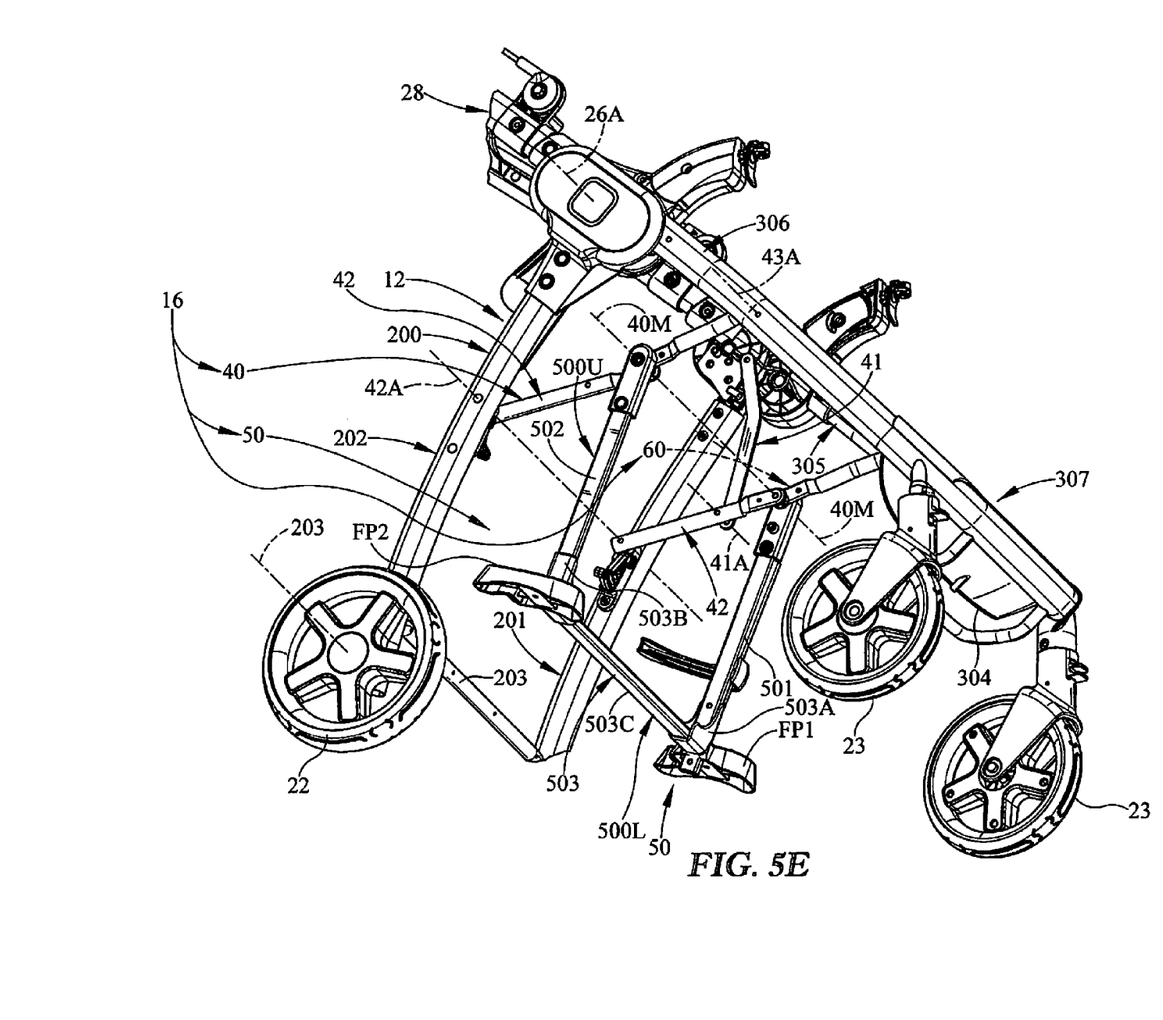
FIG. 5E is a perspective view of the underside of the stroller of FIGS. 1-4 showing the components illustrated in FIG. 5D.

A pedal-return spring 60 is also included in foot-actuated base opener 16 as suggested in FIG. 5E. Pedal-return spring 60 is coupled to spreader mover 50 in any suitable manner and configured normally to apply a torque to the pivotable spreader mover 50 to urge spreader mover 50 (and its foot pedals FP1, FP2) to lie out of the way and alongside the rolling base 20. In such a ready-to-use retracted position, each of foot pedals FP1, FP2 is nevertheless accessible and usable by a caregiver desiring to step on the foot pedal to unfold foldable frame 24 using foot action to convert stroller 10 from the collapsed storage mode shown in FIGS. 4 and 12 to the expanded use mode shown in FIGS. 1, 2, and 13.

Foot-actuated frame opener 16 includes a spreader mover 50 including a first foot pedal FP1 and a leg spreader 40. Leg spreader 40 is coupled to the rolling base 20, the rolling base stabilizer 26, and the spreader mover 50 for movement relative to each of the rolling-base stabilizer 26 and the rolling base 20 between a drawn-together position shown in FIGS. 4 and 12 and associated with the collapsed storage mode of the stroller 10 and a spread-apart position shown in FIGS. 1, 2, and 13 and associated with the expanded use mode of the stroller 10.

Spreader mover 50 further includes spring means 60 for yieldably urging the pedal-support means 500 to move relative to leg driver 41 from an extended position separated from rolling base 20 to a retracted position arranged to lie alongside rolling base 20 as suggested in FIGS. 1-3. Spring means 60 is configured to cause leg driver 41 to remain in the retracted position as suggested in FIG. 12 until a downward force F in excess of a predetermined amount is applied by a caregiver to the foot pedal FP to cause the pedal-support means 500 to pivot about an axis and move away from rolling base 20 as suggested in FIG. 13.

In illustrative embodiments, mobile base 12 also includes a storage lock tab 90 as shown in FIGS. 1, 12, and 13. Storage lock tab 90 is coupled to rolling-base pusher 28 and is formed to include a hole 91 that receives a lock pin 92 attached to rolling base 20 when foldable frame 24 is in the closed position as shown in FIG. 12. Storage lock tab 90 is flexible to be lifted out of engagement with lock pin 92 to allow movement of foldable frame 24 to the opened position.

In illustrative embodiments, frame-motion controller 25 includes storage-lock opener 94 coupled to foot pedal FP1 as shown in FIG. 5A. Storage-lock opener 94 is adapted to provide means for lifting storage lock tab 90 out of engagement with lock pin 92 when a user steps downwardly on foot pedal FP1. Storage-lock opener 94 has a cam surface 94S that engages rolling base 20 and pushed outwardly when a user steps downwardly on foot pedal FP1 to cause storage lock tab 90 to move out of engagement with lock pin 92.

In illustrative embodiments, frame-motion controller 25 also includes a tray-release mechanism 95 as shown diagrammatically in FIG. 12. Tray-release mechanism 95 is configured to release a removable tray 96 included in mobile cart 12 to pivot under gravitational forces relative to the rest of mobile cart 12 from an extended-use position to a folded-stowed position when a user lifts upwardly on fold handle 39 in direction 39U as suggested in FIG. 12. Accordingly, tray 96 is moved automatically to the folded-stowed when stroller 10 is moved to the collapsed-storage position.

In illustrative embodiments, stroller 10 includes a fold-away canopy 97 as shown diagrammatically in FIG. 13. Fold-away canopy 97 includes a closable peek-a-boo window 98 for checking on a child seated in stroller 10.

In illustrative embodiments, stroller 10 includes a storage bin 99 arranged under seat 14 as shown diagrammatically in FIG. 13. Storage bin 99 is accessible to a user pushing rolling-base pusher 28.

In illustrative embodiments, stroller 10 includes a removable seat pad (sometimes called a cover) 93 shown diagrammatically in FIG. 13. Seat pad 93 is removably coupled to seat 14 by patches of hook-and-loop material and is machine washable.

The invention claimed is:

1. A mobile cart adapted for use in a collapsible stroller, the mobile cart comprising
   a rolling base including a left wheeled leg and a right wheeled leg,
   a foldable frame including a rolling-base stabilizer coupled to the rolling base to pivot about a stabilizer-pivot axis and a rolling-base pusher coupled to the rolling base to pivot about a base-pusher axis, and
   a frame-motion controller configured to provide means for releasing the foldable frame to move from a folded-out opened position in which the rolling-base stabilizer and the rolling-base pusher extend away from the rolling base to support a child sitting on a seat mounted to the mobile cart when the mobile cart is in use to a folded-in closed position in which the rolling-base stabilizer and the rolling-base pusher extend along the rolling base in response to a user lifting upwardly with one hand on a fold handle included in the frame-motion controller and to provide unfold means for moving the foldable frame from the folded-in closed position to the folded-out opened position in response to a user stepping down on a foot pedal included in the frame-motion controller with one foot so that a user both collapses and expands the mobile cart using only one appendage while allowing the other user appendages to be free for holding a child or other items.

2. A mobile cart adapted for use in a collapsible stroller, the mobile cart comprising
   a rolling base including a left wheeled leg and a right wheeled leg,
   a foldable frame including a rolling-base stabilizer coupled to the rolling base to pivot about a stabilizer-pivot axis and a rolling-base pusher coupled to the rolling base to pivot about a pusher-pivot axis, the foldable frame being movable between a folded-out opened position in which the rolling-base stabilizer and the rolling-base pusher extend away from the rolling base and a folded-in closed position in which the rolling-base stabilizer and the rolling-base pusher extend along the rolling base, and
   a frame-motion controller including a frame closer and a frame opener, the frame closer including a lock that blocks or allows movement of foldable frame from the folded-out opened position to the folded-in closed position and a fold handle configured to release lock and allow movement of foldable frame from the folded-out opened position to the folded-in closed position, and the frame opener including a foot pedal and a linkage coupled to the foot pedal and configured to convert downward movement of the foot pedal into movement of the foldable frame from the folded-in closed position to the folded-out opened position in response to a user stepping down on the foot pedal.

3. A collapsible stroller comprising
   a mobile cart including a rolling base having rear wheels, a foldable frame mounted on the rolling base for movement relative to the rolling base between an opened position that is arranged to extend away from the rolling base and is associated with an expanded use mode of the collapsible stroller and a closed position that is arranged to lie alongside the rolling base and is associated with a collapsed storage mode of the collapsible stroller, and a frame-motion controller coupled to the foldable frame, and
   a foldable seat coupled to the foldable frame to move therewith relative to the rolling base, wherein the foldable frame includes a rolling-base stabilizer having at least one front wheel and a rolling-base pusher having a push handle, the frame-motion controller includes a lift-to-fold frame closer and a foot-activated push-to-unfold frame opener, the lift-to-fold frame closer includes a fold handle that is arranged to be gripped by a caregiver when the stroller is in the expanded use mode and a stabilizer-and-pusher pivot lock configured to provide means for locking the foldable frame to the rolling base to block movement of the foldable frame relative to the rolling base from the opened position in which the rolling-base stabilizer and the rolling-base pusher are unfolded to extend away from the rolling base and from one another to open the foldable seat that is coupled to the foldable frame to support a child on the seat and to the closed position in which the rolling-base stabilizer and the rolling-base pusher are folded to move toward one another and toward the rolling base and extend along the rolling base until the fold handle is moved relative to the foldable seat to a position unlocking the pivot lock, the foot-actuated push-to-unfold frame opener includes a spreader mover including a first foot pedal and a spreader coupled to the rolling base, the rolling-base stabilizer, and the spreader mover for movement relative to each of the rolling base and the rolling-base stabilizer between a drawn-together position associated with the closed position of the foldable frame and the collapsed storage mode of the collapsible stroller and a spread-apart position associated with the opened position of the foldable frame and the expanded use mode of the collapsible stroller, and the spreader mover further includes pedal-support means for moving the spreader relative to the front and rear wheels to move the foldable frame relative to the rolling base from the closed position to the opened position in response to application of a downward force to the first foot pedal without moving the fold handle relative to the foldable frame.

\* \* \* \* \*